(12) United States Patent
De Beer et al.

(10) Patent No.: US 8,659,637 B2
(45) Date of Patent: Feb. 25, 2014

(54) SYSTEM AND METHOD FOR PROVIDING THREE DIMENSIONAL VIDEO CONFERENCING IN A NETWORK ENVIRONMENT

(75) Inventors: Marthinus F. De Beer, Los Gatos, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 653 days.

(21) Appl. No.: 12/400,540

(22) Filed: Mar. 9, 2009

(65) Prior Publication Data

US 2010/0225732 A1 Sep. 9, 2010

(51) Int. Cl.
*H04N 7/14* (2006.01)

(52) U.S. Cl.
USPC .................... 348/14.08; 348/14.09; 348/14.1; 348/14.12; 348/14.15; 348/14.16

(58) Field of Classification Search
USPC ............................................ 348/14.01–14.16
See application file for complete search history.

(56) References Cited

U.S. PATENT DOCUMENTS

| | | | |
|---|---|---|---|
| 2,911,462 A | 11/1959 | Brady | |
| D212,798 S | 11/1968 | Dreyfuss | |
| 3,793,489 A | 2/1974 | Sank | |
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

U.S. Appl. No. 12/234,291, filed Sep. 19, 2008, entitled "System and Method for Enabling Communication Sessions in a Network Environment," Inventor(s): Yifan Gao et al.

(Continued)

*Primary Examiner* — Joseph J Nguyen
(74) *Attorney, Agent, or Firm* — Patent Capital Group

(57) ABSTRACT

A method is provided in one example embodiment and includes receiving data indicative of a personal position of an end user. A media stream is selected from a plurality of media streams to be transmitted to the end user based on the personal position. The selected media stream includes image data of an object captured by a camera and the image data is used to construct a three-dimensional rendering of the object. In more specific embodiments, the media stream selection is executed by a server configured to be coupled to a network. The camera can be part of a plurality of cameras that capture image data associated with the object and that transmit respective media streams over a network. Once a camera begins transmitting image data over the network and to the end user, other cameras from the plurality of cameras stop transmitting their respective media streams over the network.

25 Claims, 5 Drawing Sheets

(56) References Cited

U.S. PATENT DOCUMENTS

| | | | |
|---|---|---|---|
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2* | 7/2003 | Sheldon et al. ............ 348/14.09 |
| 6,591,314 B1 | 7/2003 | Colbath |
| 6,593,955 B1 | 7/2003 | Falcon |
| 6,593,956 B1 | 7/2003 | Potts et al. |
| 6,611,281 B2* | 8/2003 | Strubbe ..................... 348/14.01 |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1* | 11/2006 | Taylor et al. ........................... 1/1 |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |

(56) References Cited

U.S. PATENT DOCUMENTS

| | | |
|---|---|---|
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 8,477,175 B2 | 7/2013 | Shaffer et al. |
| 2002/0047892 A1 | 4/2002 | Gonsalves |
| 2002/0106120 A1* | 8/2002 | Brandenburg et al. ........ 382/154 |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0149724 A1 | 8/2003 | Chang |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0056056 A1 | 3/2006 | Ahiska et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1* | 9/2006 | Sinclair et al. ................ 709/204 |
| 2006/0233120 A1 | 10/2006 | Eshel et al. |

(56) References Cited

U.S. PATENT DOCUMENTS

| | | |
|---|---|---|
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1* | 7/2007 | Fry et al. ................ 370/263 |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0263079 A1 | 11/2007 | Graham et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1* | 10/2008 | Kalipatnapu et al. .... 375/240.01 |
| 2008/0297586 A1 | 12/2008 | Kurtz et al. |
| 2008/0298571 A1* | 12/2008 | Kurtz et al. ................ 379/156 |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0316232 A1 | 12/2010 | Acero et al. |
| 2011/0008017 A1 | 1/2011 | Gausereide |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0109642 A1 | 5/2011 | Chang et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |

(56) References Cited

FOREIGN PATENT DOCUMENTS

| WO | WO2012/068008 | 5/2012 |
|---|---|---|
| WO | WO2012/068010 | 5/2012 |
| WO | WO2012/068485 | 5/2012 |

OTHER PUBLICATIONS

U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,582, filed Mar. 9, 2009, entitled "System and Method for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
Active8-3D—Holographic Projection—3D Hologram Retail Display & Video Project, [retrieved Feb. 24, 2009], http://www.activ8-3d.co.uk/3d_holocubes, 1 page.
Avrithis, Y., et al., "Color-Based Retrieval of Facial Images," European Signal Processing Conference (EUSIPCO '00), Tampere, Finland; Sep. 2000; 18 pages.
Bakstein, Hynek, et al., "Visual Fidelity of Image Based Rendering," Center for Machine Perception, Czech Technical University, 10 pages.
Boccaccio, Jeff; CEPro, "Inside HDMI CEC: The Little-Known Control Feature," http://www.cepro.com/article/print/inside_hdmi_cec_the_little_known_control_feature; Dec. 28, 2007, 2 pages.
Bücken R: "Bildfernsprechen: Videokonferenz vom Arbeilsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24; 3pgs.
Chen, Jason, "iBluetooth Lets iPhone Users Send and Receive Files Over Bluetooth," Mar. 13, 2009; 1 page; http://i.gizmodo.com/5169545/ibluetooth-lets-iphone-users-send-and-receive-files-over-bluetooth.
Cisco: Bill Mauchly and Mad Marathe; UNC: Henry Fuchs, et al., "Depth-Dependent Perspective Rendering," 6 pgs.
Costa, Cristina, et al., "Quality Evaluation and Nonuniform Compression of Geometrically Distorted Images Using the Quadtree Distorion Map," EURASIP Journal on Applied Signal Processing, vol. 2004, No. 12; pp. 1899-1911; © 2004 Hindawi Publishing Corp.; XP002536356; ISSN: 1110-8657; 16 pages.
Daly, S., et al., "Face-based visually-optimized image sequence coding," Image Processing, 1998, ICIP 98, Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.
Diaz, Jesus, iPhone Bluetooth File Transfer Coming Soon (Yes!); Jan. 25, 2009; 1 page; http://i.gizmodo.com/5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.

ECmag.com, "IBS Products," Published Apr. 2009, 2 pages; http://www.ecmag.com/index.cfm§fa=article&articleID=10065.
Electrophysics Glossary, "Infrared Cameras, Thermal Imaging, Night Vision, Roof Moisture Detection," printed Mar. 18, 2010, 11 pages; http://www.electrophysics.com/Browse/Brw_Glossary.asp.
Farrukh, A., et al., Automated Segmentation of Skin-Tone Regions in Video Sequences, Proceedings IEEE Students Conference, ISCON_apos_02; Aug. 16-17, 2002; pp. 122-128; 7 pgs.
Fiala, Mark, "Automatic Projector Calibration Using Self-Identifying Patterns," National Research Council of Canada, 2005; http://www.procams.org/procams2005/papers/procams05-36.pdf; 6 pages.
Gotchev, Atanas, "Computer Technologies for 3D Video Delivery for Home Entertainment," International Conference on Computer Systems and Technologies; CompSysTech '08; 6 pgs; http://ecet.ecs.ru.acad.bg/cst08/docs/cp/Plenary/P.1.pdf.
Gries, Dan, "3D Particles Experiments in AS3 and Flash CS3, Dan's Comments," printed May 24, 2010 http://www.flashandmath.com/advanced/fourparticles/notes.html; 3pgs.
Guernsey, Lisa, "Toward Better Communication Across the Language Barrier," Jul. 29, 1999, http://www.nytimes.com/1999/07/29/technology/toward-better-communication-across-the-language-barrier.html; 2 pages.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755; 13 pages.
"Infrared Cameras TVS-200-EX," printed May 24, 2010; 3 pgs.; http://www.electrophysics.com/Browse/Brw_ProductLineCategory.asp§CategoryID=184&Area=IS.
IR Distribution Category @ Envious Technology, "IR Distribution Category," 2 pages http://www.envioustechnology.com.au/products/product-list.php§CID=305, printed on Apr. 22, 2009.
IR Trans—Products and Orders—Ethernet Devices, 2 pages http://www.irtrans.de/en/shop/lan.php, printed Apr. 22, 2009.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303; 16 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; 8 pages.
Kazutake, Uehira, "Simulation of 3D image depth perception in a 3D display using two stereoscopic displays at different depths," http://adsabs.harvard.edu/abs/2006SPIE.6055.408U; 2006, 2 pgs.
Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp§tp=&arnumber=4455782&isnumber=4455723.
Lawson, S., "Cisco Plans TelePresence Translation Next Year," Dec. 9, 2008; http://www.pcworld.com/ article/155237/.html§tk=rss_news; 2 pages.
OptoIQ, "Anti-Speckle Techniques Uses Dynamic Optics," Jun. 1, 2009, 2 pages; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dyanmic-optics/QP129867/cmpid=EnlOptoLFWJanuary132010.html.
OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2/2009/01/smart-camera-supports-multiple-interfaces.html.
OptoIQ, "Vision + Automation Products—VideometerLab 2,"; 11 pgs.; http://www.optoiq.com/optoiq-2/en-us/index/machine-vision-imaging-processing/display/vsd-articles-tools-template.articles.vi-

(56) References Cited

OTHER PUBLICATIONS sion-systems-design.volume-11.issue-10.departments.new-products.vision-automation-products.htmlhtml.
OptoIQ, "Vision Systems Design—Machine Vision and Image Processing Technology," printed Mar. 18, 2010, 2 pages; http://www.optoiq.com/index/machine-vision-imaging-processing.html.
PCT "Notification of Transmittal of the International Search Report and the Written Opinion of the International Searching Authority, or the Declaration," PCT/US2009/001070, dated Apr. 8, 2009, 17 pages.
PCT Notification of Transmittal of the International Search Report and the Written Opinion of the International Searching Authority, or the Declaration; PCT/US2009/038310; dated Oct. 10, 2009; 19 pages.
Radhika, N., et al., "Mobile Dynamic reconfigurable Context aware middleware for Adhoc smart spaces," vol. 22, 2008, 3 pages http://www.acadjournal.com/2008/V22/part6/p7.
"Robust Face Localisation Using Motion, Colour & Fusion" Dec. 10, 2003; Proc. VIIIth Digital Image Computing: Techniques and Applications, Sun C. et al (Eds.), Sydney; 10 pgs.; Retrieved from the Internet: http://www.cmis.csiro.au/Hugues.Talbot/dicta2003/cdrom/pdf/0899.pdf; pp. 899-908, XP007905630.
School of Computing, "Bluetooth over IP for Mobile Phones," 1 page http://www.computing.dcu.ie/wwwadmin/fyp-abstract/list/fyp_details05.jsp§year=2005&number=51470574.
SENA, "Industrial Bluetooth," 1 page http://www.sena.com/products/industrial_bluetooth, printed on Apr. 22, 2009.
Shaffer, Shmuel, "Translation—State of the Art" presentation; Jan. 15, 2009; 22 pages.
Shi, C. et al., "Automatic Image Quality Improvement for Videoconferencing," IEEE ICASSP © 2004, 4 pgs.
Smarthome, "IR Extender Expands Your IR Capabilities," 3 pages http://www.smarthome.com/8121.html, printed Apr. 22, 2009.
Soohuan, Kim et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; pp. 78-88; XP007905596; 11pgs.
"Super Home Inspectors or Super Inspectors," printed Mar. 18, 2010, 3 pages; http://www.umrf.com/PageManager/Default.aspx/PageID=2120325.
Tsapatsoulis, N., et al., "Face Detection for Multimedia Applications," Proceedings of the ICIP '00; Vancouver, BC, Canada; Sep. 2000; 4 pages.
Tsapatsoulis, N., et al., "Face Detection in Color Images and Video Sequences," 10$^{th}$ Mediterranean Electrotechnical Conference (MELECON), 2000; vol. 2; pp. 498-502; 21 pgs.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628; 26 pgs.
WirelessDevNet, Melody Launches Bluetooth Over IP, http://www.wirelessdevnet.com/news/2001/ 155/news5.html; 2 pages, printed on Jun. 5, 2001.
WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.
Yang, Jie, et al., "A Real-Time Face Tracker," Proceedings 3$^{rd}$ IEEE Workshop on Applications of Computer Vision; 1996; Dec. 2-4, 1996; pp. 142-147; 6 pgs.
Yang, Ming-Hsuan, et al., "Detecting Faces in Images: A Survey," vol. 24, No. 1; Jan. 2002; pp. 34-58; 25 pgs.
Yang, Ruigang, et al., "Real-Time Consensus-Based Scene Reconstruction using Commodity Graphics Hardware," Department of Computer Science, University of North Carolina at Chapel Hill, 10 pgs.
Yoo, Byounghun, et al., "Image-Based Modeling of Urban Building Using Aerial Photographs and Digital Maps," Transactions in GIS, vol. 10 No. 3, p. 377-394, 2006; 18 pages [retrieved May 17, 2010], http://icad.kaist.ac.kr/publication/paper_data/image_based.pdf.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.
Boros, S., "Policy-Based Network Management with SNMP," Proceedings of the EUNICE 2000 Summer School Sep. 13-15, 2000, p. 3.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
Garg, Ashutosh, et al., "Audio-Visual ISpeaker Detection Using Dynamic Bayesian Networks," IEEE International Conference on Automatic Face and Gesture Recognition, 2000 Proceedings, 7 pages http://www.ifp.illinois.edu/~ashutosh/papers/FGOO.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]; David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.

(56) References Cited

OTHER PUBLICATIONS

U.S. Appl. No. 12/957,116, filed Nov. 30, 2010, entitled "System and Method for Gesture Interface Control," Inventors: Shuan K. Kirby, et al.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/375,458, filed Sep. 22, 2010, entitled "Video Unit With Integrated Features," Inventor(s): Kyle A. Buzzard et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
3G, "World's First 3G Video Conference Service with New TV Commercial," Apr. 28, 2005, 4 pages; http://www.3g.co.uk/PR/April2005/1383.htm.
Andersson, L., et al., "LDP Specification," Network Working Group, RFC 3036, Jan. 2001, 133 pages; http://tools.ietf.org/html/rfc3036.
Awduche, D., et al., "Requirements for Traffic Engineering over MPLS," Network Working Group, RFC 2702, Sep. 1999, 30 pages; http://tools.ietf.org/pdf/rfc2702.pdf.
Berzin, O., et al., "Mobility Support Using MPLS and MP-BGP Signaling," Network Working Group, Apr. 28, 2008, 60 pages; http://www.potaroo.net/ietf/all-ids/draft-berzin-malls-mpls-mobility-01.txt.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFJAA&url=http%3A%2F%2Fciteseerx.ist.psu.edu%2Fviewdoc%2Fdownload%3Fdoi%3D10.1.1.93.103%26rep%3Drepl%26type%3Dpdf&ei=A28RTLKRDeftnQeXzZGRAw&usg=AFQjCNHpwj5MwjgGp-3goVzSWad6CO-Jzw.
"Custom 3D Depth Sensing Prototype System for Gesture Control," 3D Depth Sensing, GestureTek, 3 pages; [Retrieved and printed on Dec. 1, 2010]http://www.gesturetek.com/3ddepth/introduction.php.
Digital Video Enterprises, "DVE Eye Contact Silhouette," 1 page, © DVE 2008; http://www.dvetelepresence.com/products/eyeContactSilhouette.asp.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gundavelli, S., et al., "Proxy Mobile IPv6," Network Working Group, RFC 5213, Aug. 2008, 93 pages; http://tools.ietf.org/pdf/rfc5213.pdf.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrl.
Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.
Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.
PCT "Notification of Transmittal of the International Search Report and the Written Opinion of the International Searching Authority, or the Declaration," PCT/US2009/001070, dated Apr. 4, 2009, 17 pages.
PCT International Preliminary Report on Patentability mailed Aug. 26, 2010 for PCT/US2009/001070; 10 pages.
PCT International Preliminary Report on Patentability mailed Oct. 7, 2010 for PCT/US2009/038310; 10 pages.
PCT International Report of Patentability dated May 15, 2006, for PCT International Application PCT/US2004/021585, 6 pages.
PCT International Search Report mailed Aug. 24, 2010 for PCT/US2010033880; 4 pages.
"Real-time Hand Motion/Gesture Detection for HCI-Demo 2," video clip, YouTube, posted Dec. 17, 2008 by smmy0705, 1 page; www.youtube.com/watch?v=mLT4CFLi8A&feature=related.
"Simple Hand Gesture Recognition," video clip, YouTube, posted Aug. 25, 2008 by pooh8210, 1 page; http://www.youtube.com/watch?v=F8GVeV0dYLM&feature=related.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Trevor Darrell, "A Real-Time Virtual Mirror Display," 1 page, Sep. 9, 1998; http://people.csail.mit.edu/trevor/papers/1998-021/node6.html.
Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

(56) References Cited

OTHER PUBLICATIONS

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/articie/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKISTb9l4TI.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Environment," Inventors: Charles C. Byers.

Design U.S. Appl. No. 29/389,651, filed Apr. 14, 2011, entitled "Video Unit With Integrated Features," Inventor(s): Kyle A. Buzzard et al.

Design U.S. Appl. No. 29/389,654, filed Apr. 14, 2011, entitled "Video Unit With Integrated Features," Inventor(s): Kyle A. Buzzard et al.

Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.

EPO Aug. 15, 2011 Response to EPO Communication mailed Feb. 25, 2011 from European Patent Application No. 09725288.6; 15 pages.

EPO Communication dated Feb. 25, 2011 for EP09725288.6 (published as EP22777308); 4 pages.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

PCT Sep. 25, 2007 Notification of Transmittal of the International Search Report from PCT/US06/45895.

(56) References Cited

OTHER PUBLICATIONS

PCT Sep. 2, 2008 International Preliminary Report on Patentability (1 page) and the Written Opinion of the ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
Website: http://research.microsoft.com/pubs/67266/criminis_techrep2003-59.pdf, A. Criminisi, et al., "Efficient Dense-Stereo and Novel-view Synthesis for Gaze Manipulation in One-to-one Teleconferencing," Technical Report MSR-TR-2003-59, Sep. 2003 [retrieved Feb. 26, 2009], 41 pages.
Website: http://www.ee.surrey.ac.uk/CVSSP/VMRG/Publications/miller05cvmp.pdf, Gregor Miller, et al., "Interactive Free-Viewpoint Video," Centre for Vision, Speech and Signal Processing, [retrieved Feb. 26, 2009], 10 pages.
Website: http://www.merl.com/projects/3dtv, Mitsubishi Electric Research Laboratories, copyright 2009 [Retrieved Feb. 26, 2009], 2 pages.
Website: http://focus.ti.com/pdfs/dlpdmd/17_Digital_Light_Processing_MEMS_display_technology.pdf, Hornbeck, Larry J., "Digital Light Processing™: A New MEMS-Based Display Technology," [retrieved Feb. 26, 2009], 22 pages.
Website: http://www.activ8-3d.co.uk/3d_holocubes, active8-3D—Holographic Projection—3D Hologram Retail Display & Video Project, [retrieved Feb. 24, 2009], 1 page.
Website: http://gizmodo.com/5070906/dreamoc-3d-display-turns-any-phone-into-hologram-machine, Wilson, Mark, "Dreamoc 3D Display Turns Any Phone Into Hologram Machine," Oct. 30, 2008 [retrieved Feb. 24, 2009], 2 pages.
Website: http://www.t-immersion.com/en,video-gallery,36.html, Total immersion, Video Gallery, copyright 2008-2009 [retrieved Feb. 26, 2009], 1 page.
Website: http://www.minoru3d.com/, "Minoru from Novo is the worlds first consumer 3D Webcam," Dec. 11, 2008 [retrieved Feb. 24, 2009], 4 pages.
Website: http://www.zebraimaging.com/html/lighting_display.html, "Dynamic Displays," copyright 2005-2008 [retrieved Feb. 24, 2009], 2 pages.
Website: http://www.rayvel.com/b2b.html, "Rayvel Business-to-Business Products," copyright 2004 [retrieved Feb. 24, 2009], 2 pages.
Website: http://innovation.swmed.edu/research/instrumentation/res_inst_dev3d.html, Holographic Imaging, "Dynamic Holography for scientific uses, military heads up display and even someday HoloTV Using Ti's DMD," [retrieved Feb. 26, 2009], 5 pages.
Website: http://ieeexplore.ieee.org/Xplore/login.jsp?url=/ielx5/4142827/4141005/04142840.pdf?tp, IEEE Xplore—Login, Article Information, copyright 2009 [retrieved Feb. 26, 2009], 1 page.
Website: http://www3.interscience.wiley.com/journal/118566619/abstract?CRETRY=1&SRETRY=0, Wiley InterScience :: Session Cookies, "Session Cookie Error," copyright 1999-2009 [retrieved Feb. 26, 2009], 1 page.
Website: http://ntsa.metapress.com/app/home/main.asp?referrer=default, National Training Systems Association Home—Main, Interservice/Industry Training, Simulation & Education Conference, Dec. 1-4, 2008 [retrieved Feb. 26, 2009], 1 page.
Hiroyasu Itoh, et al., "Use of a gain modulating framing camera for time-resolved imaging of cellular phenomena," SPIE vol. 2979, 1997, pp. 733-740 (8 pages).
E. Trucco, et al., "Real-Time Disparity Maps for Immersive 3-D Teleconferencing by Hybrid Recursive Matching and Census Transform," Undated, 9 pages.

Jim Gemmell, et al., "Gaze Awareness for Video-conferencing: A Software Approach," IEEE Multimedia, Oct.-Dec. 2000, 10 pages.
Professor Wilson T. Freeman, Computer Vision Lecture Slides, "6.869 Advances in Computer Vision: Learning and Interfaces," Spring 2005, 21 pages.
Jeroen Keijser, et al., "Exploring 3D Interaction in Alternate Control-Display Space Mappings," IEEE Symposium on 3D User Interfaces, Mar. 10-11, 2007, pp. 17-24 (8 pages).
Arrington, Michael, "eJamming—Distributed Jamming," TechCrunch; Mar. 16, 2006; http://www.techcrunch.com/2006/03/16/ejamming-distributed-jamming/; 1 page.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261, ACTA Press, ISBN: 0-88986-528-0; 5 pages.
Chan et al., "Experiments on Block-Matching Techniques for Video Coding," Multimedia Systems, vol. 2, 1994, pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
"Cisco Expo Germany 2009 Opening," Posted on YouTube on May 4, 2009; http://www.youtube.com/watch?v=SDKsaSlz4MK; 2 pages.
eJamming Audio, Learn More; [retrieved and printed on May 27, 2010] http://www.ejamming.com/learnmore/; 4 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
"France Telecom's Magic Telepresence Wall," Jul. 11, 2006; http://www.humanproductivitylab.com/archive_blogs/2006/07/11/france_telecoms_magic_telepres_1.php; 4 pages.
Guili, D., et al., "Orchestral: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.
He, L., et al., "The Virtual Cinemalographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.
Jiang, Manqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kim, Y.H., et al., "Adaptive mode decision for H.264 encoder," Electronics letters, vol. 40, Issue 19, pp. 1172-1173, Sep. 2004; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

(56) References Cited

OTHER PUBLICATIONS

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.
Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.
PCT "International Search Report and the Written Opinion of the International Searching Authority, or the Declaration," PCT/US2010/026456, dated Jun. 29, 2010, 11 pages.
PCT Search Report for PCT Application No. PCT/US2009/064061 dated Feb. 11, 2010, 4 pages.
PCT Written Opinion for PCT Application No. PCT/US2009/064061 dated Feb. 23, 2010; 14 pages.
Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.
Richardson, L.E.G., et al., "Fast H.264 Skip Mode Selection Using and Estimation Framework," Picture Coding Symposium, (Beijing, China), Apr. 2006; www.rgu.ac.uk/files/richardson_fast_skip_estimation_pcs06.pdf; 6 pages.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
Schroeder, Erica, "The Next Top Model—Collaboration," Collaboration, The Workspace: A New World of Communications and Collaboration, Mar. 9, 2009; http://blogs.cisco.com/collaboration/comments/the_next_top_model; 3 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
U.S. Appl. No. 12/784,257, filed May 20, 2010, entitled "Implementing Selective Image Enhancement," Inventors: Dihong Tian et al.
U.S. Appl. No. 13/298,022, filed Nov. 16, 2011, entitled "System and Method for Alerting a Participant in a Video Conference," Inventor(s): TiongHu Lian, et al.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
"Eye Tracking," from Wikipedia, (printed on Aug. 31, 2011) 12 pages; http://en.wikipedia.org/wiki/Eye_tracker.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
"Rikert, T.D., et al., ""Gaze Estimation using Morphable models,"" IEEE International Conference on Automatic Face and Gesture Recognition, Apr. 1998; 7 pgs. http://citeseer.ist.psu.edu/viewdoc/summary?doi=10.1.1.30.9472".
Tan, Kar-Han, et al., "Appearance-Based Eye Gaze Estimation," In Proceedings IEEE WACV'02, 2002, 5 pages. http://citeseer.ist.psu.edu/viewdoc/summary?doi=10.1.1.19.8921.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Chien et al., "Efficient moving Object Segmentation Algorithm Using Background Registration Technique," IEEE Transactions on Circuits and Systems for Video Technology, vol. 12, No. 7, Jul. 2002, 10 pages.
EPO Jul. 10, 2012 Response to EP Communication from European Application EP10723445.2.
EPO Sep. 24, 2012 Response to Mar. 20, 2012 EP Communication from European Application EP09725288.6.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.

(56) References Cited

OTHER PUBLICATIONS

""Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

EPO Mar. 20, 2012 Communication from European Application 09725288.6; 6 pages.

PCT Jan. 23, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

PCT Mar. 21, 2013 International Preliminary Report on Patentability from International Application Serial No. PCT/US2011/050380.

PCT May 30, 2013 International Preliminary Report on Patentability and Written Opinion from the International Searching Authority for International Application Serial No. PCT/US2011/061442 8 pages.

PCT May 30, 2013 International Preliminary Report on Patentability and Written Opinion from the International Searching Authority for International Application Serial No. PCT/US2011/060579 6 pages.

PCT May 30, 2013 International Preliminary Report on Patentability and Written Opinion from the International Searching Authority for International Application Serial No. PCT/US2011/060584 7 pages.

PRC Jan. 7, 2013 SIPO Second Office Action from Chinese Application Serial No. 200980105262.1.

PRC Apr. 3, 2013 SIPO Second Office Action from Chinese Application No. 200980119121.5; 16 pages.

PRC Jun. 18, 2013 Response to SIPO Second Office Action from Chinese Application No. 200980119121.5; 5 pages.

PRC Jul. 9, 2013 SIPO Third Office Action from Chinese Application No. 200980119121.5; 15 pages.

"Weinstein et al., ""Emerging Technologies for Teleconferencing and Telepresence,"" Wainhouse Research 2005 http://www.ivci.com/pdf/whitepaper-emerging-technologies-for-teleconferencing-and-telepresence.pdf".

\* cited by examiner

SYSTEM AND METHOD FOR PROVIDING THREE DIMENSIONAL VIDEO CONFERENCING IN A NETWORK ENVIRONMENT

TECHNICAL FIELD OF THE INVENTION

This invention relates in general to the field of communications and, more particularly, to providing three-dimensional video conferencing in a network environment.

BACKGROUND OF THE INVENTION

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. These technologies can transmit life-size, high-definition images, and spatial discrete audio. Specially designed, high-definition cameras can provide quality, high-definition images with superior eye contact. The audio facilitates a full natural conversation with no perceivable latency.

Some issues have arisen in video conferencing scenarios, as systems haves shifted to three-dimensional imaging. Three-dimensional technology presents a significant challenge to developers and network operators, who attempt to offer a video conferencing solution that is realistic, while accounting for bandwidth parameters. Thus, the ability to properly manage three-dimensional video conferencing in a network provides a significant challenge to network designers, component manufacturers, service providers, and system administrators alike.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving data indicative of a personal position of an end user. A media stream is selected from a plurality of media streams to be transmitted to the end user based on the personal position. The selected media stream includes image data of an object captured by a camera and the image data is used to construct a three-dimensional rendering of the object. In more specific embodiments, the media stream selection is executed by a server configured to be coupled to a network. The camera can be part of a plurality of cameras that capture image data associated with the object and that transmit respective media streams over a network. Once a camera begins transmitting image data over the network and to the end user, other cameras from the plurality of cameras stop transmitting their respective media streams over the network. In still other embodiments, the media stream selection is executed by a computer being used by the end user, the computer including an embedded camera for detecting the personal position of the end user. The personal position can be identified through one or more algorithms that detect facial positions and movements, or eye positions. The object can be a counterparty to a video conference involving the end user.

Figure 1:
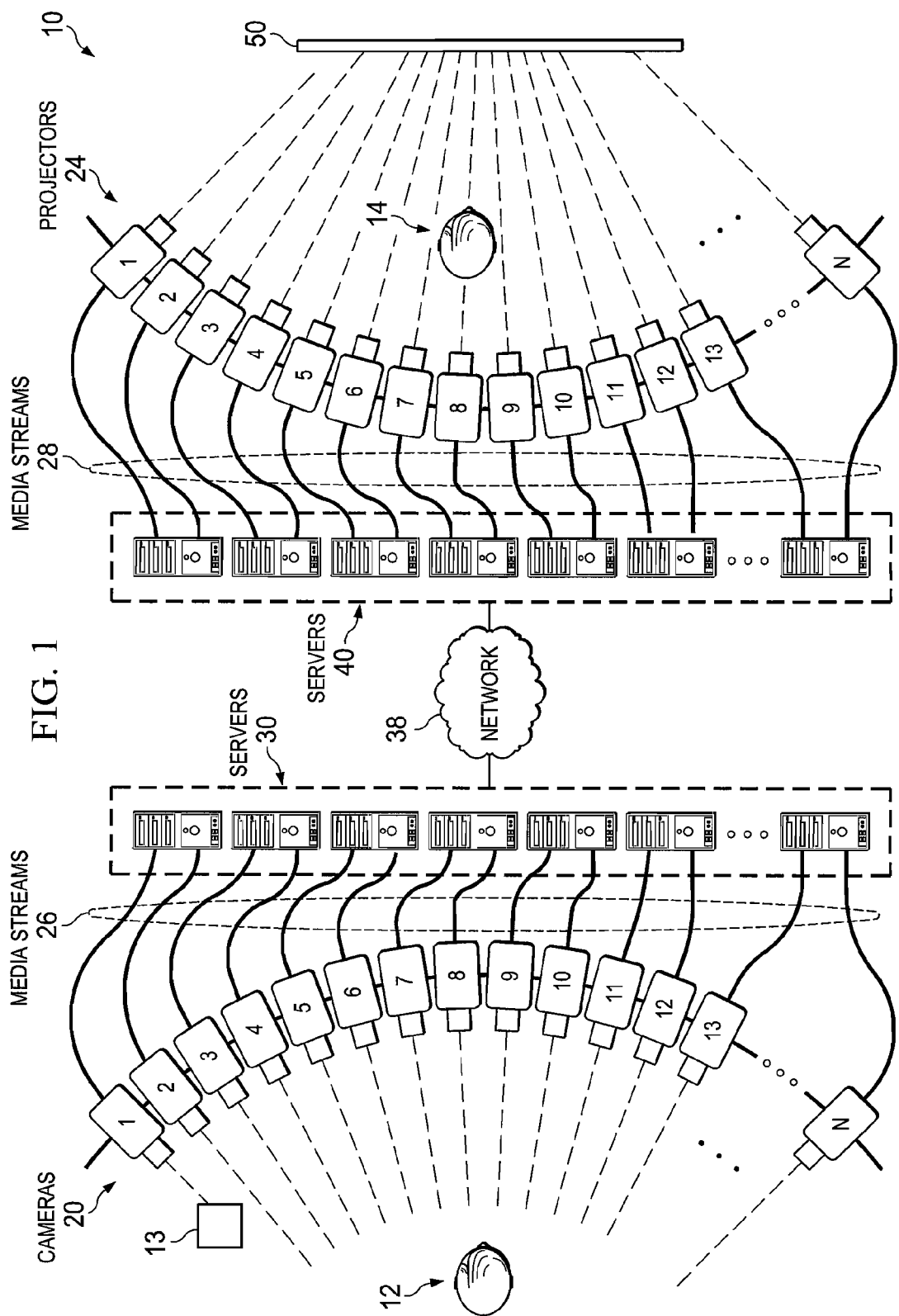
FIG. 1 is a simplified schematic diagram of a conferencing system for providing three-dimensional video operations in a network environment in accordance with one embodiment.

Turning to FIG. 1, FIG. 1 is a simplified schematic diagram of a conferencing system 10 in accordance with one example embodiment. Conferencing system 10 includes an object 12, a viewer 14, and a set of cameras 20 that are configured to be coupled to a group of servers 30, which have a connection to a network 38. Network 38 is configured to be coupled to another group of servers 40, which can communicate with a group of projectors 24 in order to render an image on a multiview screen 50. A set of media streams can be sent to servers 30 (from cameras 20) to be transmitted over network 38. Similarly, a set of media streams 28 can be sent from servers 40 and to projectors 24 in formulating an image to be seen by viewer 14.

In one example, screen 50 is constructed of a special material that makes it a "multiview" screen. Using this special screen, viewer 14 better sees an image, which is projected on the screen from a projector that is just behind him. In FIG. 1, this is the image projected by projector #8 and the head of viewer 14 can line up in such a manner that the line between the camera and viewer 14 passes through the middle of the viewer's head.

Each of the elements of FIG. 1 may couple to one another through simple interfaces or through any other suitable connection (wired or wireless), which provides a viable pathway for communications. Additionally, any one or more of these elements may be combined or removed from the architecture based on particular configuration needs. Note that servers 30 and 40 could be an array of servers, or a single server depending on the specific computational power of the server(s), the resolution of the video cameras, the number of frames per second from the cameras, as well as other relevant video related parameters.

Conferencing system 10 may include a configuration capable of transmission control protocol/internet protocol (TCP/IP) communications for the transmission or reception of packets in a network. Conferencing system 10 may also operate in conjunction with a user datagram protocol/IP (UDP/IP) or any other suitable protocol or tunneling technique, where appropriate and based on particular needs.

To provide a true three-dimensional (3D) transported presence, a system should be able to record and display 3D images. For 3D objects, as a viewer positions his head in different positions around an observed object, the viewer will naturally see different views of that object. For example, assume that a viewer sees the 3D face of another person. As the viewer moves his position [relative to that person], he can see the profile of that counterparty from the right side, from a direct [eye-to-eye] view, and from a left profile of that person.

In a video conferencing session that uses a personal computer screen, the image of a remote user is presented as a two dimensional (2D) image. For a 2D display, an image does not change as the viewer moves his position relative to the display. For example, if a video conferencing screen presents the right sided profile image of a remote person, as the viewer changes his position relative to his personal computer screen, the image seen by the viewer (on his personal computer) does not change. Instead, the viewer only sees the right sided profile of the remote user.

Some architectures can offer a 3D video conferencing experience, but these architectures are expensive (e.g., costly projectors, cameras, servers, etc.) and introduce considerable overhead into the data transmissions. Excessive bandwidth consumption could pose a significant problem for such a system. For example, FIG. 1 could use a plethora of video cameras to capture different views of object 12. The video could then be transported to a local site, where it is fed to different projectors 24 located in positions relative to the positions of cameras 20, which recorded the original video. The system can use a multiview screen, which can accommodate various views.

As a viewer moves his position relative to the multiview screen, he can see one of the projected images better than the other images. For example, if the architecture included sixteen cameras, then sixteen projectors would be used to project image data such that a viewer could view one set of image data and not the other fifteen sets of image data. The performance of such a system is rather marginal because of the leakage of projected images from cameras other than the one associated with the angle of viewing. Additionally, multiview screens provide only a limited number of views and, as such, when a viewer changes his position relative to the screen, the display appears jittery.

Returning to FIG. 1, for purposes of illustration, an example conferencing scenario is provided. In this example, there are two participants on a video conference. The first participant represents the object, whereas the second participant represents the viewer. In some instances, there could be symmetry in equipment such that each participant fulfills both roles as object and viewer. However, in this example scenario to simplify the explanation, one location has different equipment than the remote location.

Focusing on the object side for a moment, a number of cameras 20 are provided that capture image data associated with object 12 from multiple viewing angles. These cameras could be mounted in any suitable fashion, such as in an arc configuration, which is illustrated in FIG. 1. Other configurations could be arbitrary wall mountings, or arrangements in which cameras would be equidistantly spaced, or provided linearly as a string of cameras. In essence, the cameras are capturing image data from the object on all sides. In other arrangements, the cameras could be mounted on a panel or a wall employing TelePresence technology manufactured by Cisco Systems of San Jose, Calif.

The objective in these camera configurations is to capture and transmit image data to a viewer location, which can view the object in three dimensions. The system utilizes multiple cameras at the remote site to capture views of a remote object from multiple angles. At the viewer's location, projectors 24 render the image on multiview screen 50. In one example, the geometry of projectors 24 mimics the geometry of cameras 20 such that if cameras 20 were arranged radially (in an arc configuration), then projectors 24 would also be configured in the same radial arrangement. In a similar endeavor, camera #1 could interface (or be aligned with) projector #1, camera #2 with projector #2, and so forth.

Note that one aspect of three-dimensional imaging includes the notion of a viewer tilting his head from side to side in an effort to glean certain dimensional aspects of the object at the other end of the video conference. In such an instance, the viewer can see a complete picture of the object by simply moving his head from side to side, as would conventionally be done if two people were having an actual conversation facing each other [e.g., on a sidewalk, on a street corner, etc.].

The second aspect of three-dimensional imaging is parallax, which is an apparent displacement or difference of orientation of an object viewed along two different lines of sight. This is generally measured by the angle or semi-angle of inclination between those two lines. Nearby objects have a larger parallax than more distant objects when observed from different positions. Human perception includes overlapping visual fields to use parallax to gain depth perception and this process is known as stereopsis.

Turning back to the illustration of FIG. 1, if viewer 14 is receiving images (for example) from camera #1, he may encounter a situation in which portions of object 12 are obscured from this particular vantage. For purposes of illustrating this concept, an obscuring object 13 is depicted in FIG. 1 and it is between camera #1 and object 12. However, this obscurity is not present at camera #12 and obscuring object 13 does not block the field of view between camera #12 and object 12. Media streams 26 can capture multiple camera perspectives such that, as viewer 14 moves from side to side or changes his orientation, he sees an image from a specific projector associated with a specific camera, which captured the image of the object from an angle associated with the position of the viewer relative to the multiview screen. It is the property of the multiview screen that allows an observer to see images projected from a specific projector, which is behind the user [in a line between the specific projector and multiview screen 50], and thereby overcome this obscurity or simply see object 12 unobstructed. In the example of FIG. 1, this architecture is quite comprehensive in that it includes multiple projectors and multiple cameras for rendering three-dimensional images. The projectors can collectively render an image on a multiview screen for viewer 14 to see.

Figure 2:
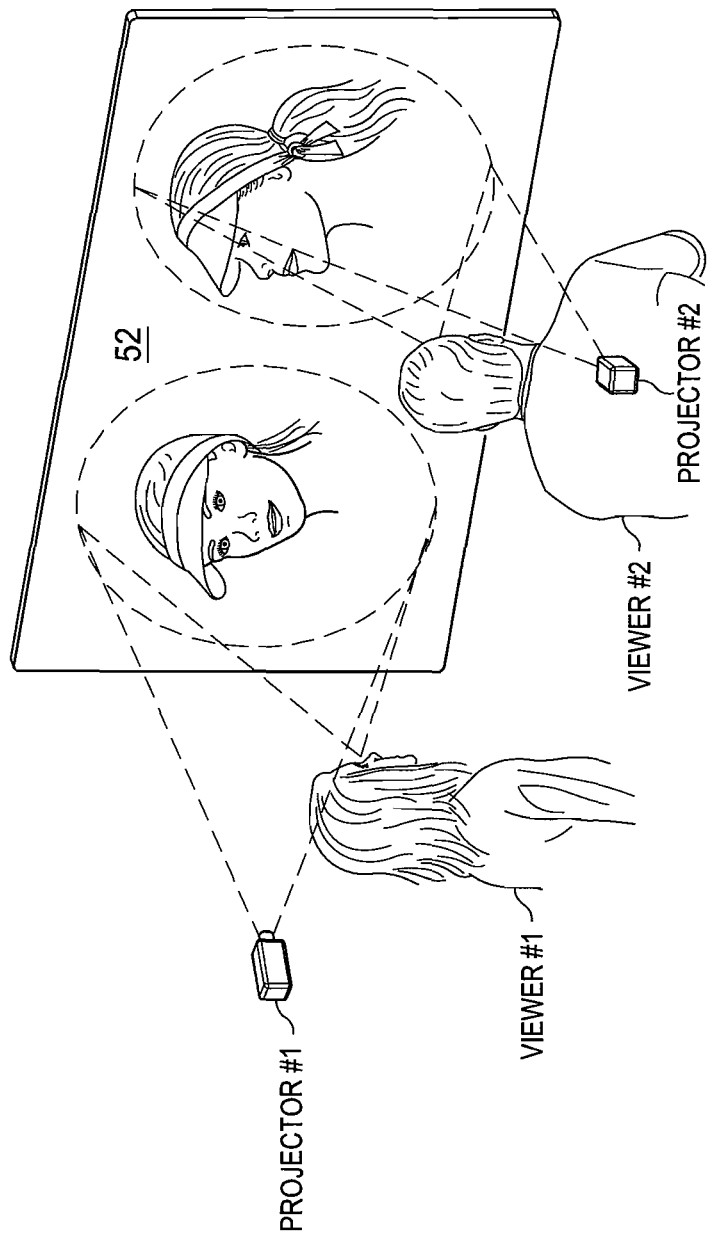
FIG. 2 is a simplified schematic diagram of an image being seen by viewers from two different projectors in accordance with one embodiment.

FIG. 2 is a simplified schematic diagram of an image 52 in which a viewer #1 and a viewer #2 are seeing an image 52 utilizing two different projectors (i.e., projector #1 and projector #2 respectively). In this example, the image is a girl wearing a visor cap, where the first viewer sees one side of her image and the second viewer sees a different perspective of this image. This is because the first viewer is associated with projector #1 and the second viewer is associated with projector #2. As the viewer changes his current position, he can see different details associated with this particular image. For example, as the viewer moves from one location/vantage to another, he could see that this girl has a ponytail. If this scenario involved a video conference between two participants, as the viewer moved his own location, he could see a different side (or angle) of a counterparty on the video conference. In effect, the viewer is utilizing different projectors and different camera angles in order to see additional details that would otherwise not be shown to him in a simplistic face-to-face conversation scenario.

Figure 3:
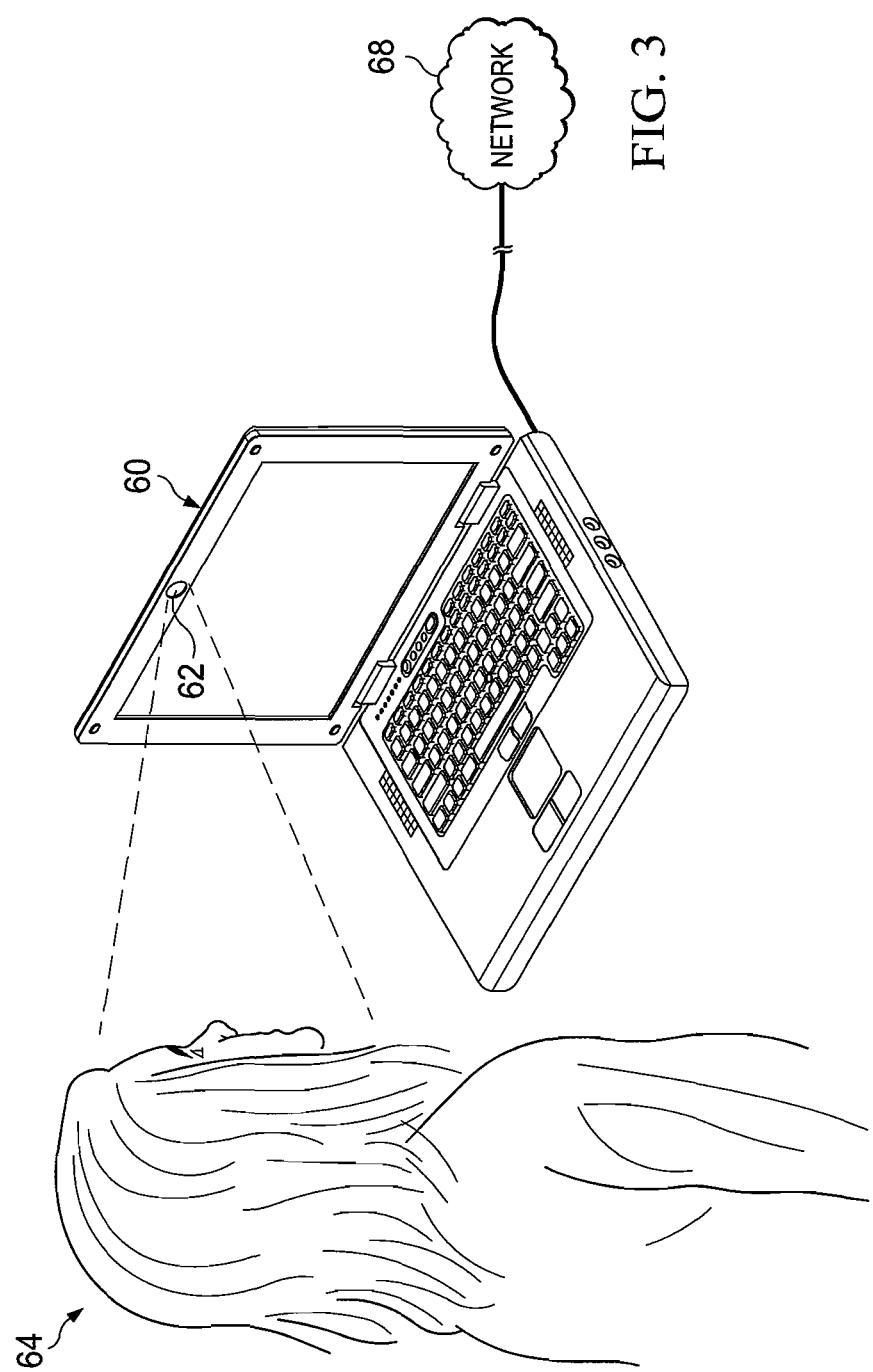
FIG. 3 is a simplified schematic diagram that illustrates an example user of a video conferencing architecture in accordance with one embodiment.

FIG. 3 is a simplified schematic diagram of a viewer 64, who is working with a personal computer (PC) 60. Personal computer 60 includes an embedded camera 62, which is used to capture and transmit the image of viewer 64 to a remote video conferencing partner (not shown). Personal computer 60 can be configured to be coupled to a network 68 through various potential arrangements such that image data can readily be transmitted over network 68.

Figure 4:
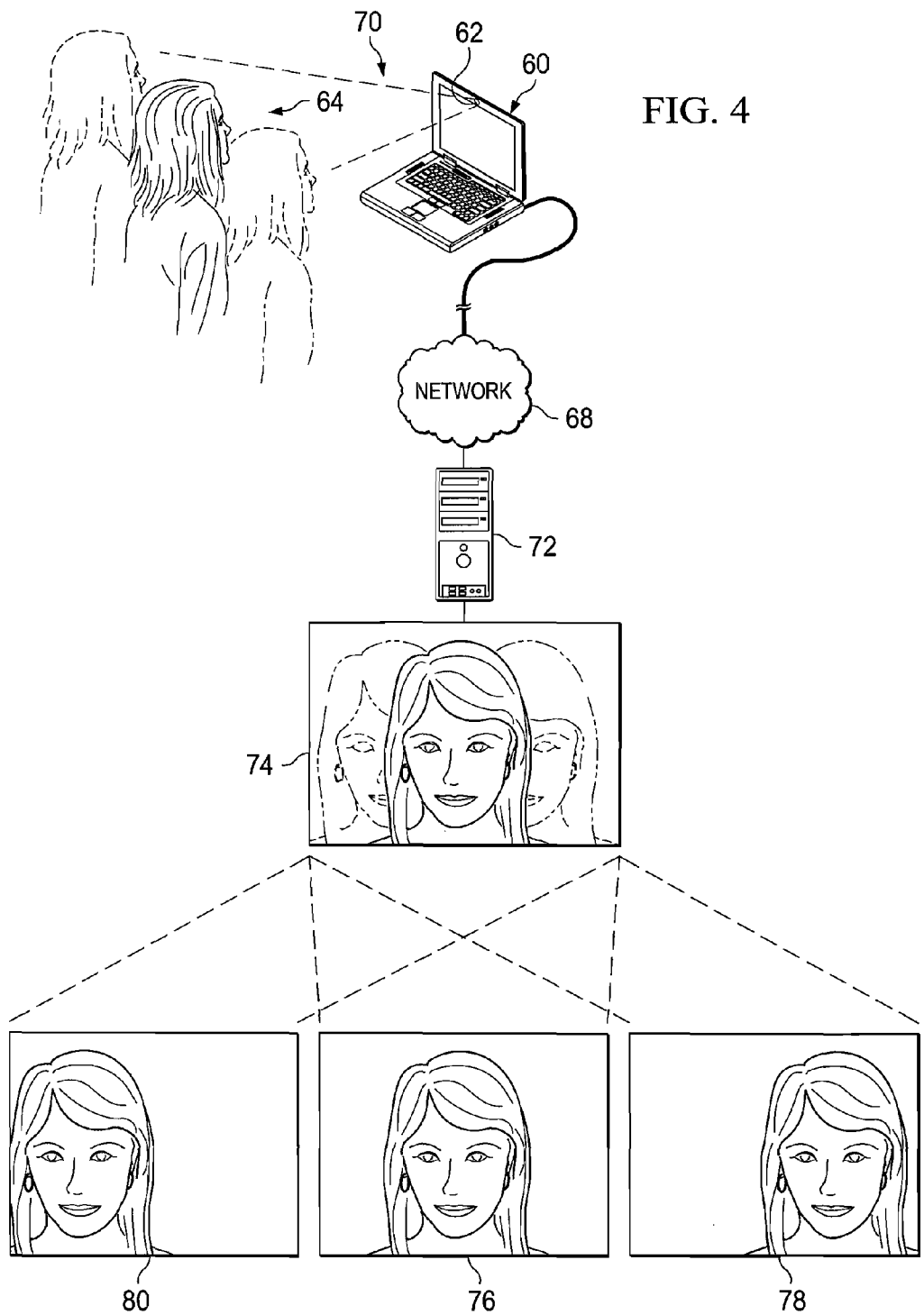
FIG. 4 is a simplified schematic diagram of an example implementation of a video conferencing architecture in accordance with one embodiment.

FIG. 4 is a simplified schematic diagram of an example arrangement associated with a video conferencing scenario. The same viewer 64 is depicted in this example, where network 68 is configured to be coupled to a server 72. As shown in this embodiment, viewer 64 can move his head left and right, and back and forth and still be kept within the camera's field of view (shown generally at an arrow 70). All of this head positioning can be captured by server 72, which can store and process a virtual image 74 of viewer 64 within field of view 70 of camera 62. Virtual image 74 can be sent over network 68 from PC 60 to server 72, which is attached to network 68 and which can capture the position of the head of viewer 64 in virtual image frame 74, as the user moves left and right (in relation to PC 60). This movement is illustrated by a set of virtual images 76, 78, and 80, which show viewer 64 in the middle, right side, and left side of an image.

In addition, viewer 64 can have his position tracked (e.g., via server 72, via some software being provisioned in the network, or software that is resident on PC 60 [or software that is provided externally to PC 60], etc.) such that when he tilts his head from side to side, he can see different angles of a remote object being shown on his individual display. For example, software can use facial and eye recognition algorithms to identify when viewer 64 has shifted his line of sight and then respond by changing the angle of perception being rendered to his PC.

Consider a case where someone has bitten into an apple and removed a portion of this object. If the apple were placed on a desk, the perspective of the viewer would dictate if he sees this missing bite. In a simple linear video conferencing arrangement, viewer 64 might only see the front of the apple and nothing else. In contrast, the arrangement of FIG. 3 allows viewer 64 to move left and right and actually see that there is a bite missing from this apple. Software provided at various locations (as described previously) can identify when the viewer has shifted his head in an attempt to see a different angle of the viewed object. In specific embodiments, server 72 has video analytics software capable of recognizing when viewer 64 has shifted his head, as shown in virtual images 76, 78, and 80. Thus, when viewer 64 moves to the right, he is indirectly, or inadvertently, telling the system that he would like to see a different perspective associated with objects appearing on the screen of his computer. In essence, viewer 64 is requesting the view from a different angle of view and, thereby, from a different camera at the remote location.

This discussion also lends itself to FIG. 2 and the way in which a given viewer can change his perspective and re-associate himself with a different camera and a different projector. As viewer 64 moves to the right, he moves into alignment with projector #2. In a similar fashion, as viewer 64 moves to the left, he aligns himself with projector #1. In the context of the architecture of FIG. 4, server 72 has the intelligence to indicate to projector #2 to stop projecting image data, as viewer 64 moves to the left and receives information from projector #1. Additionally, in one example embodiment, as projector #2 is instructed to stop projecting image data, so too should camera #2 stop capturing and/or transmitting image data over the network. This could offer a considerable efficiency and bandwidth savings because this unnecessary information is no longer being transmitted over the network.

Figure 5:
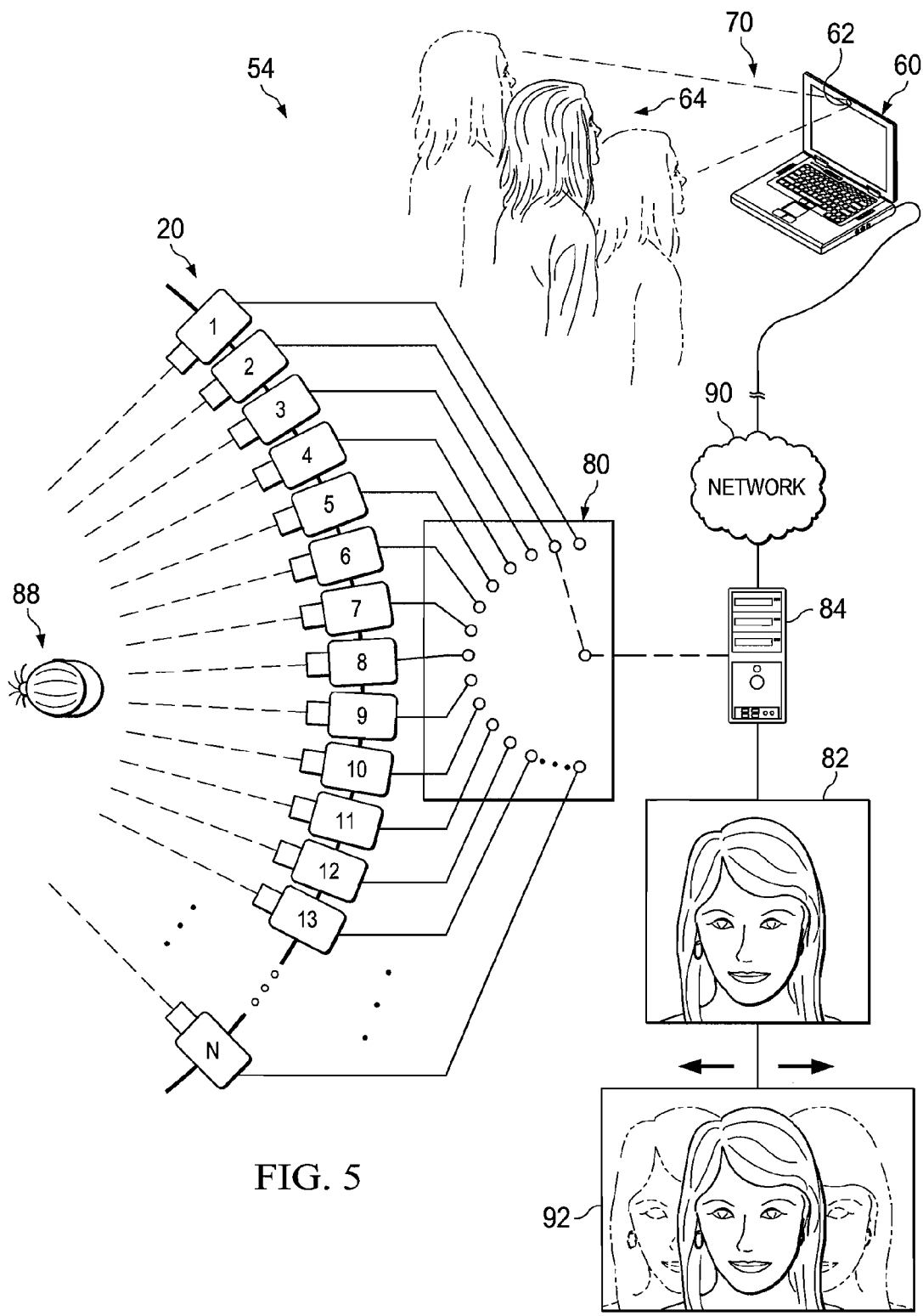
FIG. 5 is a simplified schematic diagram of another example implementation of a video conferencing architecture in accordance with one embodiment.

FIG. 5 is a simplified schematic diagram illustrating a system 54 that can allow a given viewer to control various video streams at a single point 80 at which a single video stream is selected. A number of cameras are depicted in order to capture image data associated with an object 88. A server 84 is configured to be coupled to a network 90, and the server can receive and analyze a virtual image 82 of viewer 64 in a corresponding memory of server 84. Below virtual image 82 is an illustration of head positioning variations for a set of virtual images 92 for this particular user. A line is shown with arrows [left and right] to show the position (left/right) of the head in virtual image 82 relative to the center of the image. The viewer location can select a particular media stream to be transmitted. This viewer location can be derived with respect to the viewer's particular screen of PC 60. In a sense, through facial indicators, or through head movements, the viewer is controlling the video stream that is rendered to him from camera array 20. Note that in order to facilitate a smooth transition amongst the videos from the multiple cameras, media capturing of the respective video frames from the plurality of cameras can be synchronized. Also note that the selection process can be performed by a personal computer of the viewer, or there is an option for video analytics (and video stream selection) being performed by a server attached to the network [e.g., server 84 of FIG. 5].

The dashed line depicted in FIG. 5 is acting as a control for the video stream being shown to the viewer. Thus, this virtual switch is selecting which camera is sending its images over network 90 and onto the viewer. Therefore, image data from a single camera can be selected and propagated over the network in contrast to having a full array of cameras sending image data continually over the network. Not only would such transmissions be wasteful, but they would also be cumbersome in terms of processing and, further, possibly create an impossible bandwidth scenario for network links and endpoints that could not handle such a large amount of data.

The receiving side in this scenario is only receiving image data associated with a single camera and, therefore, is only receiving a single media stream. Reciprocally, the sending side is only sending image data from a single camera and this activity is being dictated by the viewer moving left and right in front of his computer. Just as importantly, the viewer is able to see object 88 from different sides, which enhances his perception or visualization of object 88. The system can use a commercial off-the-shelf (COTS) PC with a 2D display to give the user the ability to see the image from multiple views as a function of his head position. This can provide the viewers with a 3D viewing capability using a 2D display.

In another example operational flow, the system can utilize a face detection algorithm to detect the position of a local participant relative to his personal computer. In this example, the video camera is integrated with a personal computer, which is a current feature for many personal computers (e.g., Apple computers). This particular user (having a video-enabled personal computer) is participating in a video conference with remote TelePresence users.

The personal computer video camera captures the image of the local participant and sends it to a processing platform or server attached to the network for processing and for subsequent distribution to remote sites. The server could include an image-processing platform such as Cisco's media experience engine (MXE), which is a processing element that can attach to the network. The MXE can simplify media sharing across the network by optimizing its delivery in any format for any device. It could also provide media conversion, real-time postproduction, editing, formatting, and network distribution for visual communications. The system can utilize real-time face and eye recognition algorithms to detect the position of the participant's eyes in the video frame. In this example, the system analyzes the position of the eyes of the local user in the video frame. The system then presents the local user media stream relative to his position in the video frame.

In this example embodiment, the analysis of the specific position of the viewer's head in field of view 70 (or the corresponding frame of virtual image 82) could be done at the endpoint personal computer, or at the digital signal processing (DSP) level. As the system detects the position of the local conference participant [e.g., viewer 64] relative to his personal computer, the system selects the appropriate media stream from the plurality of media streams captured by the remote site cameras 20 and renders it to the local participant/viewer.

In accordance with one embodiment, the selection of the video stream to be rendered to the personal computer is made at the source. As such, the remote site does not need to send the video from all of its cameras. Rather, the remote site sends only the video from the camera that represents the viewing angle of the local participant relative to his personal computer. In accordance with yet another embodiment, the remote site sends all of its video streams to the processing server, which can be attached to the network. The determination of which video stream should be selected and sent to the local personal computer could be made in the processing server. In either case, the location of the local participant relative to his personal computer can govern the media selection process.

In the case when the system detects multiple people gazing at the same personal computer screen, the system has various policies it can execute. For example, the system can be configured to default to a single view and present the view from the middle of the remote room. A second option could involve the system detecting which participant (from the group of local participants) is the speaker and then presenting the media stream associated with the location of the latest speaker in the room. In a third option, the system can detect the top ranking person among the personal computer viewers (e.g., using a company directory) and present the conference from his point of view. In other cases, a hierarchy could be preprogrammed into the system, or at the outset/establishment of the video conference.

There are a number of important advantages that such a system can offer. For example, the system can utilize an off-the-shelf personal computer, as opposed to an expensive multiview display (such as the one described in FIG. 1) to achieve its intended functionality. The architecture grants access to the 3D functionality for any user utilizing a simple personal computer. Additionally, examples outlined herein in this Specification can send only a single video stream to a personal computer user. Therefore, the system can be used by users at home, who have limited bandwidth (e.g., a digital subscriber line (DSL) connection). In addition, such a system can scale well, as the need for multiple expensive projectors and a multiview screen is eliminated. The tendered architecture can also operate with multiple viewers. Some example configurations include the ability to default to a 2D system when more than one viewer is detected. Moreover, the system can utilize a processing server (e.g., an MXE), which moves the 3D functionality selection of an appropriate media stream relative to the position of the viewer into the network.

Software for checking the position of the viewer (for example, with respect to his screen) can be provided at various locations. In one example implementation, this software is provided in the various servers described herein. This could involve servers 84, 72, 24, and/or 30. In other examples, this could involve a proprietary element, which could be provided in (or proximate to) PC 60 (or any other device being used by a given end-user in a video conferencing scenario), or be provisioned somewhere in the network. The image recognition and/or face recognition software can identify where the viewer is at any given moment, or based on data from a previous frame. Based on this information, a command can be sent to the remote location to render image data from a particular camera. The remote site could be sending any number of sets of image data from various cameras. A server at the remote location (for example, servers 30) can dictate which cameras should be transmitting its media stream over the network, and which cameras should not.

As used herein in this Specification, the term 'server' is meant to encompass routers, switches, bridges, gateway, processors, loadbalancers, firewalls, or any other suitable device, component, element, or object operable to exchange or process information in a network environment. Moreover, these servers may include any suitable hardware, software, components, modules, interfaces, or objects that facilitate the operations thereof. This may be inclusive of appropriate algorithms and communication protocols that allow for the effective exchange of data or information. Also, as used herein, the term 'personal position' [in regards to capturing the positioning of the end user in front of his computer] includes any vertical or lateral positions (or movements) of the end user's head (and associated anatomy), etc. and also includes any facial or eye positions that can be detected or otherwise recognized by a system. This can include positions (or movements) relative to a point of reference (e.g., a screen of a computer) or other types of head positions, which are arbitrary or identified through position detection technology, or through other protocols in which there may or may not be a point of reference. Any such approaches are included in the term 'personal position' and, accordingly, should be construed as such. The term 'computer' in such scenarios includes any type of personal digital assistant (PDA), a personal computer (PC), a laptop or electronic notebook, a cellular telephone, an IP telephone with video capabilities, an I-Phone, or any other device, component, element, or object capable of initiating video data exchanges within a system. This includes accompanying panels and screens in which such a computer could proxy the video data and then assist in rendering images to a subsequent plane.

In one example implementation, a processing server includes software for achieving some or all of the functionalities outlined herein [for example, determining which video stream to capture, transmit, and/or receive]. In other embodiments, this feature may be provided external to the server or included in some other network device, or in a computer (e.g., a personal computer) to achieve these intended functionalities. Alternatively, both of these elements (the personal computer and the server) can include this software (or reciprocating software) that can coordinate in order to achieve the media stream selection operations outlined herein. In still other embodiments, one, two, or all of these devices may include any suitable algorithms, hardware, software, components, modules, interfaces, or objects that facilitate the operations thereof.

Each of these elements (the server and the personal computer) can also include memory elements for storing information to be used in achieving the control and general processing mechanisms outlined herein. Additionally, each of these devices may include a processor that can execute software (e.g., logic) or an algorithm to perform the activities discussed in this Specification. These components may further keep information in any suitable memory element such as a random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that system 54 of FIG. 5 (and its teachings) are readily scalable. The architecture of FIG. 5 represents a scalable architecture by minimizing the required bandwidth and by using an inexpensive off-the-shelf PC. System 54 can accommodate a large number of components, as well as more complicated or sophisticated arrangements and configurations. Accordingly, the examples provided should not limit the scope or inhibit the broad teachings of system 54, as potentially applied to a myriad of other architectures.

It is also important to note that the steps described with reference to the preceding FIGURES illustrate only some of the possible scenarios that may be executed by, or within, conferencing system 10 and system 54. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by conferencing system 10 and system 54 in that any suitable arrangements, chronologies, configurations, and timing mechanisms may be provided without departing from the teachings of the discussed concepts.

The concepts presented herein can also readily be applied to video game applications and related screens, equipment, and/or consoles. In addition, these outlined concepts could employ the use of a single camera that could (in some manner) capture multiple angles of perception. This could involve some sort of scanning operation, or actual physical motion on the part of a single camera, or involve movement of its internal components. Any such single camera configurations (and any permutations thereof) are clearly within the scope of the presented material.

Numerous other changes, substitutions, variations, alterations, and modifications may be ascertained to one skilled in the art and it can be intended that the discussed concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   receiving data indicative of a personal position of an end user;
   selecting a media stream from a plurality of media streams to be transmitted to the end user based on the personal position, wherein each of the media streams includes image data of an object captured by a camera and the image data is used to construct a three-dimensional rendering of the object;
   detecting a change in the personal position of the end user to a new personal position; and
   selecting a second media stream from the plurality of media streams to be transmitted and presented to the end user, wherein the second media stream is selected based on the new personal position; and
   wherein if multiple end users are detected at a computer screen, a default mechanism is triggered to provide a single view, which is presented from a middle of a remote room that includes the computer screen, and a hierarchy is determined amongst the end users and a media stream is selected that is associated with a highest-ranking end user of the hierarchy.

2. The method of claim 1, wherein the media stream selection is executed by a server configured to be coupled to a network.

3. The method of claim 1, wherein the camera is part of a plurality of cameras that capture image data associated with the object and wherein each of the cameras transmits a respective one of the plurality of media streams over a network.

4. The method of claim 3, wherein only one of the plurality of cameras transmits image data over the network and to the end user at a time.

5. The method of claim 1, wherein the media stream selection is executed by a computer being used by the end user, the computer including an embedded camera for detecting the personal position of the end user.

6. The method of claim 1, wherein the personal position is identified through one or more algorithms that detect facial positions, or eye positions.

7. The method of claim 1, wherein the camera is part of an array of cameras and media capturing of respective video frames from the array of cameras is synchronized.

8. The method of claim 1, wherein if multiple end users are detected at a computer screen, a speaker is detected and a media stream is selected that is associated with a location of the speaker.

9. Logic encoded in one or more non-transitory tangible media for execution and when executed by a processor operable to:
   receive data indicative of a personal position of an end user;
   select a media stream from a plurality of media streams to be transmitted to the end user based on the personal position, wherein each of the media streams includes image data of an object captured by a camera and the image data is used to construct a three-dimensional rendering of the object;
   detect a change in the personal position of the end user to a new personal position; and
   select a second media stream from the plurality of media streams to be transmitted and presented to the end user, wherein the second media stream is selected based on the new personal position; and
   wherein if multiple end users are detected at a computer screen, a default mechanism is triggered to provide a single view, which is presented from a middle of a remote room that includes the computer screen, and a hierarchy is determined amongst the end users and a media stream is selected that is associated with a highest-ranking end user of the hierarchy.

10. The logic of claim 9, wherein the camera is part of a plurality of cameras, each transmitting one of the media streams, and wherein only one of the plurality of cameras transmits image data over a network and to the end user at a time.

11. The logic of claim 9, wherein the media stream selection is executed 15 by a computer being used by the end user, the computer including an embedded camera for detecting the personal position of the end user.

12. The logic of claim 9, wherein the personal position is identified through one or more algorithms that detect facial positions, or eye positions.

13. The logic of claim 9, wherein the camera is part of an array of cameras and media capturing of respective video frames from the array of cameras is synchronized.

14. An apparatus, comprising:
a server configured to:
receive data indicative of a personal position of an end user;
select a media stream from a plurality of media streams to be transmitted to the end user based on the personal position, wherein each of the media streams includes image data of an object captured by a camera and the image data is used to construct a three-dimensional rendering of the object;
detect a change in the personal position of the end user to a new personal position; and
select a second media stream from the plurality of media streams to be transmitted and presented to the end user, wherein the second media stream is selected based on the new personal position; and
wherein if multiple end users are detected at a computer screen, a default mechanism is triggered to provide a single view, which is presented from a middle of a remote room that includes the computer screen, and a hierarchy is determined amongst the end users and a media stream is selected that is associated with a highest-ranking end user of the hierarchy.

15. The apparatus of claim 14, wherein the media stream selection is executed by a computer being used by the end user, the computer including an embedded camera for detecting the personal position of the end user.

16. The apparatus of claim 14, wherein the camera is part of a plurality of cameras that capture image data associated with the object and wherein each of the cameras transmits a respective one of the plurality of media streams over a network.

17. The apparatus of claim 16, wherein only one of the plurality of cameras transmits image data over the network and to the end user at a time.

18. The apparatus of claim 14, wherein the personal position is identified through one or more algorithms that detect facial positions, or eye positions.

19. The apparatus of claim 14, wherein video analytics and media stream selection is performed by the server, which is attached to a network.

20. A system, comprising:
means for receiving data indicative of a personal position of an end user;
means for selecting a media stream from a plurality of media streams to be transmitted to the end user based on the personal position, wherein each of the media streams includes image data of an object captured by a camera and the image data is used to construct a three-dimensional rendering of the object;
means for detecting a change in the personal position of the end user to a new personal position; and
means for selecting a second media stream from the plurality of media streams to be transmitted and presented to the end user, wherein the second media stream is selected based on the new personal position; and
wherein if multiple end users are detected at a computer screen, a default mechanism is triggered to provide a single view, which is presented from a middle of a remote room that includes the computer screen, and a hierarchy is determined amongst the end users and a media stream is selected that is associated with a highest-ranking end user of the hierarchy.

21. The system of claim 20, wherein the camera is part of a plurality of cameras that capture image data associated with the object and wherein each of the cameras transmits a respective one of the plurality of media streams over a network.

22. The system of claim 21, wherein only one of the plurality of cameras transmits image data over the network and to the end user at a time.

23. The system of claim 20, wherein the personal position is identified through one or more algorithms that detect facial positions, or eye positions.

24. The system of claim 20, wherein the media stream selection and video analytics are performed by a server, which is attached to a network.

25. The system of claim 20, wherein if multiple end users are detected at a computer screen, a speaker is detected and a media stream is selected that is associated with a location of the speaker.

* * * * *